United States Patent
Nakamura

(10) Patent No.: US 6,783,132 B2
(45) Date of Patent: Aug. 31, 2004

(54) CYLINDER HEAD GASKET WITH SEAL COATINGS

(75) Inventor: Hironobu Nakamura, Tokyo (JP)

(73) Assignee: Ishikawa Gasket Co., Ltd., Tokyo (JP)

( * ) Notice: Subject to any disclaimer, the term of this patent is extended or adjusted under 35 U.S.C. 154(b) by 0 days.

(21) Appl. No.: 10/267,737

(22) Filed: Oct. 10, 2002

(65) Prior Publication Data

US 2003/0075873 A1 Apr. 24, 2003

(30) Foreign Application Priority Data

Oct. 23, 2001 (JP) .................................. 2001-325045

(51) Int. Cl.[7] .............................................. F02F 11/00
(52) U.S. Cl. .................................... 277/592; 277/596
(58) Field of Search ........................ 277/592, 594, 277/596

(56) References Cited

U.S. PATENT DOCUMENTS

| | | | | |
|---|---|---|---|---|
| 4,830,698 A | * | 5/1989 | DeCore et al. ............. 156/219 |
| 5,150,910 A | * | 9/1992 | Udagawa ...................... 277/592 |
| 5,280,928 A | * | 1/1994 | Ueta et al. ................... 277/595 |
| 5,582,415 A | * | 12/1996 | Yoshida et al. ............. 277/592 |
| 6,145,847 A | * | 11/2000 | Maeda et al. ............... 277/593 |
| 6,328,313 B1 | * | 12/2001 | Teranishi et al. ........... 277/592 |
| 6,343,795 B1 | * | 2/2002 | Zerfass et al. ............... 277/593 |
| 6,349,945 B1 | * | 2/2002 | Schmucker et al. ........ 277/592 |
| 6,517,085 B2 | * | 2/2003 | Udagawa et al. ........... 277/592 |

* cited by examiner

*Primary Examiner*—Alison K. Pickard
(74) *Attorney, Agent, or Firm*—Manabu Kanesaka

(57) ABSTRACT

A metal gasket seals two engine members of an internal combustion engine. The metal gasket includes a metal gasket member extending substantially throughout an entire area of the engine members and has two surfaces to contact the engine members. At least two seal coatings are coated on the two surfaces of the gasket member to constitute sealing lines on the surfaces of the gasket member. One of the sealing lines on one surface of the metal gasket member is shifted from the other of the sealing lines on the other surface of the metal gasket member. Micro coatings are coated on the two surfaces of the gasket member. The thickness of the micro coating is less than that of the seal coating.

7 Claims, 3 Drawing Sheets

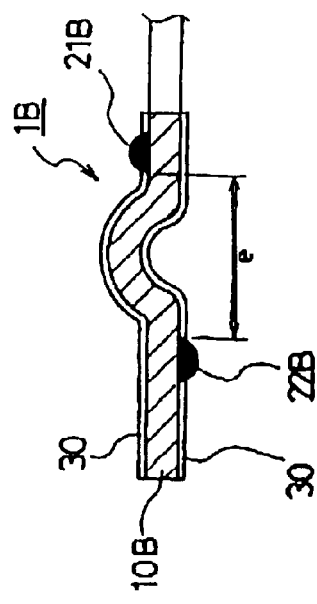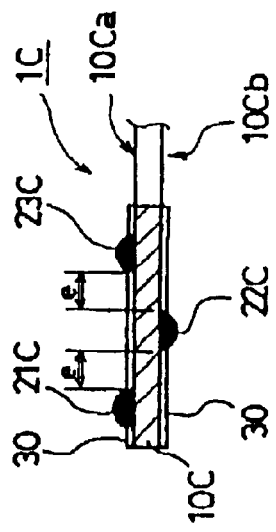
Fig. 4(a)
Fig. 4(b)
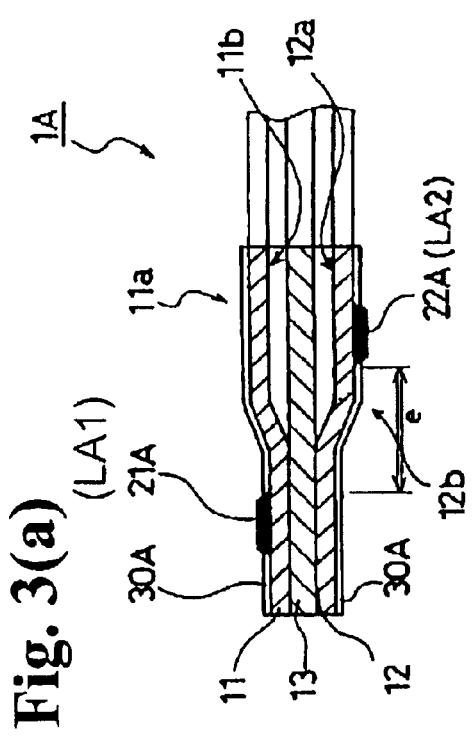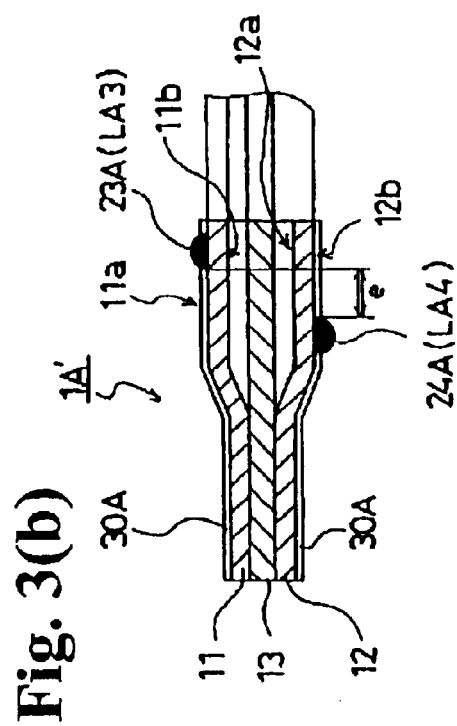
Fig. 3(a)
Fig. 3(b)

CYLINDER HEAD GASKET WITH SEAL COATINGS

BACKGROUND OF THE INVENTION AND RELATED ART STATEMENT

The invention relates to a cylinder head gasket installed between two engine members such as a cylinder head and a cylinder block of an internal combustion engine to seal therebetween.

When joint surfaces between the cylinder head and the cylinder block (a cylinder body) of the engine in an automobile are sealed, a cylinder head gasket is installed therebetween to seal combustion gas, cooling water and the like.

Due to demands for lighter weight and lower cost of the automobile engines, a structure of the cylinder head gasket has been shifted to a simple type formed of a single metal base plate from a laminated type having a number of metal plates. As the simple type structure is made of a single plate, only limited types of materials can be used.

In the laminated type metal plate gasket, a sealing member such as a bead, grommet and shim can be combined as necessity and provided in double for effective sealing. However, in the single plate gasket, a kind and a number of sealing members are limited, so that a simplified sealing device has to be used. Moreover, an area available for the sealing device is limited due to reduction in an engine size.

As shown in FIG. 1, the cylinder head gasket is formed for fitting to a shape of an engine member such as a cylinder block. The cylinder head gasket includes holes 2 for cylinder bores; fluid holes 3 for circulating cooling water and engine oil; bolt holes 4 for tightening bolts; and a gear box hole 5 and the like. Also, sealing devices, such as beads 12, 13, are provided with respect to the respective holes to be sealed.

Although one single gasket is used to seal between the engine components, different sealing properties are required to seal the different holes. For sealing the cylinder bores 2, it is required to seal the combustion gas with a high temperature and a high pressure, while a fluid with a relatively low temperature and a low pressure needs to be sealed at the fluid holes 3.

An arc shape bead 12 with a narrow width, which is formed of an elastic material for fitting to an irregular surface, is provided around the cylinder bore 2. Also, the cylinder bore 2 is surrounded by the bolt holes 5. Bolts are inserted into the bolt holes 5 to tighten the cylinder head and the cylinder block by applying a large pressure.

A bead 13 is provided around the fluid hole 3 to seal the same. Depending on a structure of the engine, there is a case that the fluid hole 3 is formed outside an area surrounded by the bolt holes 5. In this case, the pressures of the tightening bolts are applied on only one side of the fluid hole 3, thereby reducing the tightening force. To solve the problem, a higher bead, a narrower bead, or a pointed bead has been used.

Further, to seal a small uneven surface like a tool mark or the like formed on a sealing surface of the engine member, such as the cylinder head and the cylinder block, micro sealing coatings made of rubber, such as NBR rubber and fluoro rubber, are applied to entire surfaces on both sides of the gasket.

Since the micro sealing coating generally has a pencil hardness of 2H–4B and a thickness of 10 $\mu$m–30 $\mu$m, the micro sealing coating has a sufficient sealing effect with respect to a small uneven surface in an order of 5 $\mu$m–15 $\mu$m, such as a tool mark left on the sealing surface of the engine member. However, the micro sealing coating can not effectively seal a slightly larger uneven surface like a V-notch and a step with a 20 $\mu$m–50 $\mu$m depth.

Especially, in a case that a relatively large scratch formed on the surface of the engine member crosses a sealing line formed of the bead or the like, a part of the scratch is not sufficiently sealed. Thus, the combustion gas, cooling water or oil may leak.

The leaking problem by the scratch such as a V-notch on the sealing surface of the engine member has been a serious problem. This is because a relatively soft and fragile metal such as an aluminum alloy has been used for an engine member to reduce a weight of the engine. Also, even slight leak of the combustion gas, cooling water or oil needs to be prevented.

In view of the above problems, the present invention has been made. An object of the invention is to provide a cylinder head gasket formed of a single metal base plate or multiple plates, wherein the cylinder head gasket has a plurality of sealing lines having proper hardness, thereby being able to seal a relatively large scratch formed on the surface of the engine member. Further, a plurality of the sealing lines provides the metal gasket with a resistance against flow and torque down, thereby obtaining a good sealing ability and durability.

Further objects and advantages of the invention will be apparent from the following description of the invention.

SUMMARY OF THE INVENTION

In order to attain the above objects, a cylinder head gasket of the present invention is structured as follows. The cylinder head gasket is formed of a single metal base plate for sealing between two components, wherein both sides of the metal plate are coated with micro seal coatings. At least a pair of sealing lines is formed of seal coatings with a thickness larger than the micro seal coating on flat portions of both sides of the metal plate. A position where one of the sealing lines is formed on one side of the metal plate is shifted relative to a position where the other of the sealing lines is formed on the other side of the metal plate.

Here, the flat portions are areas where no uneven surface associated with a full bead or no step/slant surface associated with a half bead is formed. Also, at least the pair of the sealing lines is formed on both sides of the metal plate, wherein at least one sealing line is formed on one side of the metal plate and at least one sealing line is formed the other side of the metal plate. That is, the sealing lines are paired with respect to both sides of the metal plate. Accordingly, there may be a case where odd number of the sealing line(s) is/are formed on one side and even number of the sealing lines is formed on the other side.

The cylinder head gasket may be formed of laminated multiple metal base plates for sealing two components, wherein both outer sides of the metal plates are coated with the micro sealing coatings. At least a pair of sealing lines is formed of sealing coatings with a thickness larger than the micro sealing coatings on the flat portions on both sides of the metal plates. A position where one of the sealing lines is formed on one side of the metal plate is shifted relative to a position where the other of the sealing lines is formed on the other side of the metal plate.

In the above-mentioned metal gasket, the sealing coating is a foamed coating formed of silicone, and the micro sealing coating is a rubber coating made of fluoro rubber or NBR rubber.

That is, the foamed seal coating is made of a foamed synthetic resin like a silicone resin containing micro capsules, and is coated by a screen printing to form the sealing line having a thickness of 40 $\mu$m–150 $\mu$m, a width of 0.5 mm–5 mm and a hardness more than 2B in pencil hardness. The micro seal coating is made of fluoro rubber or NBR rubber, and is coated on both entire surfaces of the gasket by a screen printing to form a thin coating having a thickness of 10 μm–30 μm and a hardness H to 2B in pencil hardness.

According to the structure described above, since the seal coatings are provided on the surfaces of the gasket where an engine component contacts, a sufficient sealing effect is achieved with respect to a scratch, such as a V-notch, larger than a tool mark formed on the sealing surface where the gasket contacts.

Further, the positions where the sealing lines of the sealing coatings are provided are shifted between a front side and a backside. Thus, the number of the sealing lines is increased, thereby improving the sealing effect.

Further, the micro seal coatings are provided on the surfaces where the seal coatings are applied, and both sides of the seal coatings are sandwiched and fixed. Thus, the seal coatings are prevented from flowing.

Also, the seal coating is provided on an area where there is no uneven surface of the bead, thereby causing no negative effect on a function of the bead. Further, the sealing line is provided separate from a sealing line provided by the bead, thereby improving the sealing effect.

BRIEF DESCRIPTION OF THE DRAWINGS

FIGS. 2(a)–2(c) are schematic views showing a cylinder head gasket according to an embodiment of the present invention, wherein FIG. 2(a) is a sectional view taken along line 2(a)—2(a) in FIG. 1, FIG. 2(b) is a sectional view taken along line 2(b)—2(b) in FIG. 1, and FIG. 2(c) is a sectional view taken along line 2(c)—2(c) in FIG. 1;

FIGS. 3(a)–3(b) are sectional schematic views showing a cylinder head gasket according to another embodiment of the present invention, wherein FIG. 3(a) shows a structure in which seal coatings are formed with a bead in between, and FIG. 3(b) shows a structure in which seal coatings are formed without sandwiching a bead; and FIGS. 4(a)–4(b) are sectional views showing a cylinder head gasket according to another embodiment of the present invention, wherein FIG. 4(a) shows a structure in which a seal coating is provided on both sides of a semicircular bead, and 4(b) shows a structure in which two seal coatings are provided on one side, and one seal coating is provided on the other side.

DETAINED DESCRIPTION OF PREFERRED EMBODIMENTS

Hereunder, embodiments of a cylinder head gasket according to the present invention will be explained with reference to the accompanied drawings.

Figure 1:
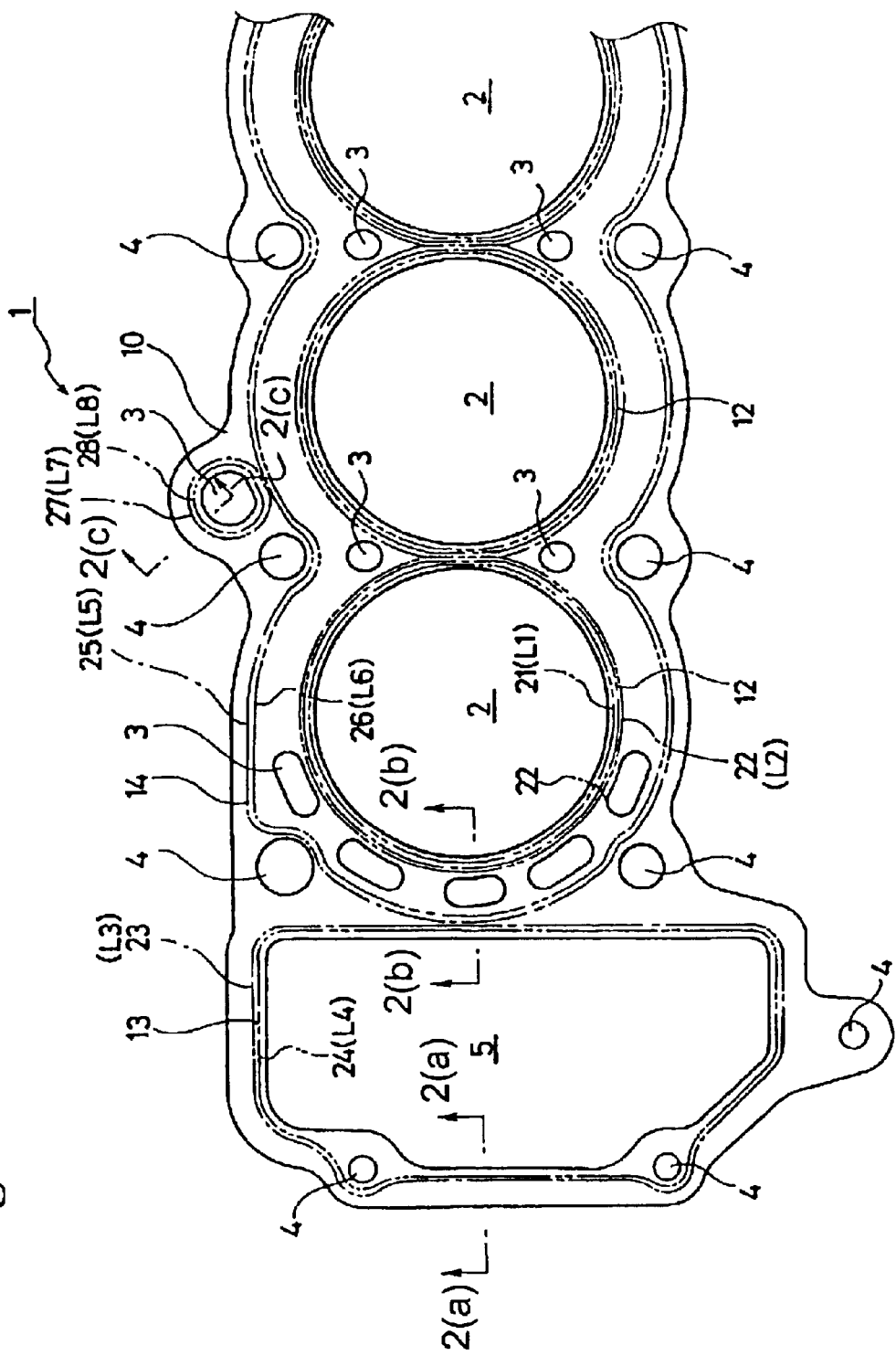
FIG. 1 is a plan view showing a cylinder head gasket according to the present invention.

As shown in a plan view of a cylinder gasket 1 in FIG. 1, the cylinder head gasket 1 of an embodiment according to the present invention is installed between a cylinder head and a cylinder block (both not shown) of an engine. The cylinder head gasket 1 seals combustion gas with a high temperature and pressure in a cylinder bore, and a fluid, such as cooling water and cooling oil, passing through a cooling water path and a cooling oil path.

Incidentally, FIGS. 2(a)–2(c), 3(a)–3(b) and 4(a)–4(b) are explanatory schematic views. A plate thickness of a gasket, a dimension and a length to width ratio of a bead and a sealing groove are different from the actual ones, and a sealing portion is enlarged for a demonstration purpose.

As shown in FIGS. 1 and 2(a)–2(c), the cylinder head gasket 1 of the first embodiment according to the present invention is formed of a single metal base plate 10 made of annealed stainless steel, heat-treated stainless steel (spring steel), soft steel or the like. The metal base plate 10 is formed to fit a shape of an engine member, such as a cylinder block. A plurality of cylinder bores 2, fluid holes 3, bolt holes 4 for tightening bolts, a gear box hole 5 and the like are formed in the metal base plate 10.

In the metal base plate 10, there are provided sealing means made of a full bead 12 around the cylinder bores 2, sealing means made of a half bead 13 around the gear box hole 5, and sealing means made of a half bead 14 around a part of the fluid holes 3 such as a cooling water hole and an oil hole.

Figure 2B:
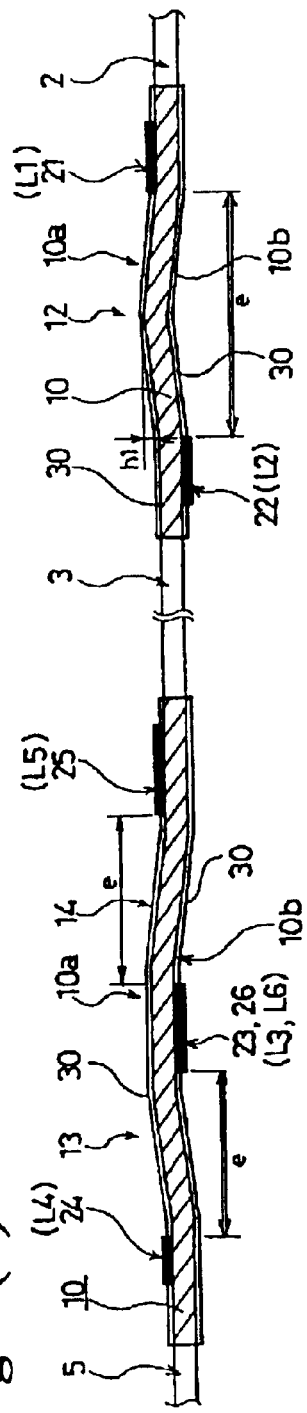
Figure 2A:
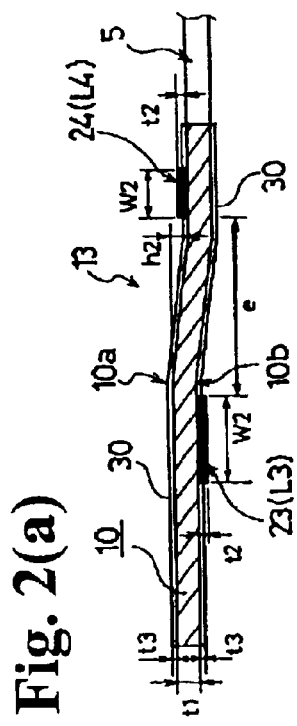

In the present invention, as shown in FIGS. 1 and 2(a)–2(b), seal coatings 21–26 made of a foamed coating are formed near the sealing means such as the beads 12, 13, and 14, thereby providing sealing lines L1–L6 on both sides of the metal base plate 10.

Figure 2C:
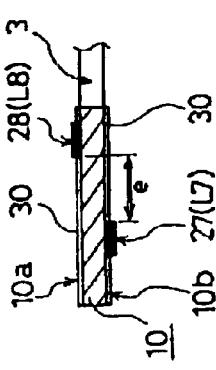

Also, as shown in FIGS. 1 and 2(c), sealing coatings 27 and 28 made of a foamed coating are formed to provide sealing lines L7 and L8 instead of the sealing means.

The sealing lines L1–L8 are arranged to shift by a distance 'e' between a front surface 10a and a back surface 10b of the metal base plate 10. Accordingly, when the gasket 1 is sandwiched between engine components, these sealing lines L1 and L2 (similarly L3 and L4, L5 and L6, L7 and L8) are not overlapped at the same location.

The seal coatings 21–28 made of the foamed coating are formed of such a material as a foamed resin like silicone containing micro capsules, and are coated by a screen printing to form the sealing lines having a thickness of 40 μm–150 μm, a width of 0.5 mm–5 mm and a hardness more than 2B in pencil hardness.

Further, the micro seal coating 30 is made of fluoro rubber or NBR rubber, and is coated on both entire surfaces 10a and 10b of the gasket by a screen printing to form a thin coating having a hardness H to 2B in pencil hardness.

Incidentally, dimensions of a plate thickness and the like are, for example, as follows: in a case that a diameter of a cylinder bore is 80 mm, a thickness t1 of the metal base plate 10 is 0.2–1.0 mm; a height h1 of the full bead 12 for the cylinder bore 2 is 0.2–0.3 mm; a height h2 of the half bead 13 for the fluid hole 3 is 0.2–0.4 mm; a thickness t2 of the seal coating 21–28 is 40–150 μm; and a thickness t3 of the micro seal coating 30 is 10–30 μm.

Also, a width w2 of the seal coating 21–24 is about 0.5–5.0 mm, and the shift distance 'e' is about 1–5 mm. Note that the width w2 and the shift distance 'e' are not necessarily a constant value, and may be adjusted to be an appropriate value according to a shape of the sealing portion.

According to the cylinder head gasket 1 of the configuration described above, since the seal coatings 21–28 are provided, it is possible to effectively seal a scratch like a V-shape notch on an engine component, which is larger than a small scratch like a tool mark.

Further, the pairs of the sealing lines of the seal coatings 21 and 22, namely L1 and L2, L3 and L4, L5 and L6, and L7 and L8, are arranged to shift between the front surface 10a and the back surface 10b of the metal base plate 10. Thus, the number of the seal lines is increased, thereby improving the sealing efficiency.

Further, as opposed to a case that the seal coatings are provided at the same locations, it is possible to reduce a sealing surface pressure and minimize torque down, which is a phenomenon where the sealing surface pressure is gradually decreasing while sealing, thereby improving the sealing efficiency.

Next, a metal gasket 1A (1A') of the second embodiment as shown in FIGS. 3(a) and 3(b) will be explained. The metal gaskets 1A and 1A' as shown in FIGS. 3(a) and 3(b)

are formed of two metal plates 11, 12 and a middle plate 13. Seal coatings 21A and 22A (23A, 24A for the metal gasket 1A') are provided on a surface 11a (with the other surface 11b) of the metal plate 11 and a surface 12b (with the other surface 12a) of the metal plate 12, thereby forming sealing lines LA1 and LA2 (LA3 and LA4 for the gasket 1A').

The sealing line LA1 (LA3) of the sealing coating 21A (23A) formed on the one surface 11a of the gasket 1A (1A') is arranged to shift from a position where the sealing line LA2 (LA4) of the sealing coating 22A (24A) is formed on the other surface 12b.

Further, the micro seal coatings 30A are made of fluoro rubber or NBR rubber, and are coated on both entire surfaces 11a and 12b of the gasket 1A (1A') by a screen printing to form thin coatings having a hardness H to 2B in pencil hardness.

According to the gasket 1A and 1A' having the configuration described above, the same effects of the metal gasket 1 in the first embodiment can be obtained Next, another embodiment will be explained with reference to FIGS. 4(a) and 4(b). FIG. 4(a) shows an example in which seal coatings 21B and 22B are provided on both sides of a semicircular bead 12B in a head gasket 1B made of a single metal base plate. FIG. 4(b) shows an example in which one sealing coating 22C is provided on one side 10Cb of a metal base plate 10C, and two seal coatings 21C and 23C are provided on the other side 10Ca in a head gasket 1C made of a single metal base plate. Micro seal coatings 30 are also applied on both surfaces of the gaskets 1B, 1C.

As described above, according to the metal gasket of the present invention, the following benefits can be obtained. The seal coatings constituting the sealing lines are formed on the surfaces of the metal base plate of the metal gasket, and the positions of the sealing lines of the seal coatings are shifted. Thus, the number of the sealing lines is increased thereby improving the sealing efficiency.

Further, as opposed to a case that the seal coatings are provided at the same locations, it is possible to reduce a sealing surface pressure and minimize torque down, which is a phenomenon where the sealing surface pressure is gradually decreasing while sealing, thereby improving the sealing durability.

Also, the seal coating is provided on an area where there is no uneven surface of the bead, thereby causing no negative effect on a function of the bead. Further, the sealing line is provided separate from a sealing line provided by the bead, thereby improving the sealing effect. The beads and the seal coatings are separated, so that it is easier to design and determine a parameter like the sealing surface pressure.

The seal coatings are formed on the surfaces of the gasket, which contact the engine components like the cylinder head and the cylinder block. Thus, a scratch like a V-notch, which is larger than a small scratch like a tool mark, formed on the surface of the engine component can be sealed more effectively.

Further, the micro seal coatings are provided on the surfaces where the seal coatings are applied, and both sides of the sealing coatings are sandwiched and fixed. Thus, the seal coatings are prevented from flowing. Therefore, the gasket with excellent sealing ability and durability can be obtained.

While the invention has been explained with reference to the specific embodiments of the invention, the explanation is illustrative and the invention is limited only by the appended claims.

What is claimed is:

1. A metal gasket for sealing two parts, comprising:
   one metal gasket member extending substantially throughout an entire area of the parts and having a bead and two outer surfaces to contact the parts,
   at least two elongated seal coatings coated on the two surfaces of the gasket member to be spaced apart from each other to sandwich the bead therebetween without overlapping the bead to thereby constitute sealing lines on the surfaces of the gasket member, said sealing lines being arranged so that one of the sealing lines on one surface of the gasket member is laterally shifted from the other of the sealing lines on the other surface of the gasket member without providing the seal coatings on immediate opposite sides of the gasket member, respectively, and
   micro coatings coated on the two surfaces of the gasket member without overlapping the seal coatings and having a thickness less than that of the seal coating.

2. A metal gasket according to claim 1, wherein said seal coatings are elongated lines disposed at flat areas of the gasket member and contact the micro coatings at edges thereof.

3. A metal gasket according to claim 2, wherein said bead has a trapezoidal shape having a flat top portion, inclined side portions outside the top portion, and outer portions outside the side portions, said seal coatings being formed at the flat top portion and the outer portions.

4. A metal gasket according to claim 3, wherein said seal coating formed at the flat top portion is deposited on a concave side of the bead.

5. A metal gasket according to claim 1, wherein said seal coating is made of a foamed silicone resin, and said micro seal coating is formed of fluoro rubber or natural butadiene rubber.

6. A metal gasket according to claim 1, wherein said bead is a half bead having an inclined side portion, and two outer portions outside the inclined side portion, each outer portion having a projecting side and a dent side relative to the inclined side portion, said seal coatings being formed on the dent sides.

7. A metal gasket for sealing two parts, comprising:
   a metal gasket member extending substantially throughout an entire area of the parts and having two surfaces to contact the parts, said metal gasket member being formed of at least two outer plates with half beads laminated together to constitute a metal laminate gasket, each outer plate having first and second side portions relative to the half bead, said at least two outer plates being piled such that the second side portions are spaced apart from each other,
   at least two seal coatings coated on the two surfaces of the gasket member to be located on the second side portions of the at least two outer plates to constitute elongated sealing lines on flat areas on the surfaces of the gasket member, said sealing lines being arranged so that one of the sealing lines on one surface of the gasket member is shifted from the other of the sealing lines on the other surface of the gasket member, and micro coatings coated on the two surfaces of the gasket member and having a thickness less than that of the seal coating.

* * * * *